POWER TEMPERING OF QUADRATURE HYBRID-COUPLED FAN-OUTS

Filed March 29, 1968 6 Sheets-Sheet 1

INVENTOR
H. SEIDEL
BY
Sylvan Sherman
ATTORNEY

4-LEVEL FAN OUT

Jan. 13, 1970 H. SEIDEL 3,490,054

POWER TEMPERING OF QUADRATURE HYBRID-COUPLED FAN-OUTS

Filed March 29, 1968 6 Sheets-Sheet 3

POWER TEMPERING OF QUADRATURE HYBRID-COUPLED FAN-OUTS 3,490,054
Patented Jan. 13, 1970

3,490,054

POWER TEMPERING OF QUADRATURE HYBRID-COUPLED FAN-OUTS

Harold Seidel, Warren Township, County of Somerset, N.J., assignor to Bell Telephone Laboratories, Incorporated, Murray Hill, N.J., a corporation of New York Filed Mar. 29, 1968, Ser. No. 717,341
Int. Cl. H01p 5/14
U.S. Cl. 333—10 7 Claims

ABSTRACT OF THE DISCLOSURE

This application describes a power-tempering arrangement wherein the signal components in symmetrical pairs of branches of a quadrature hybrid-coupled fan-out are combined to produce output signals of more uniform power content.

Power-tempered recombination is accomplished by means of a conjugate quadrature hybrid-coupled fan-in network comprising a fan-out network modified by the addition of 180 degree phase shifters at selected locations in the circuit.

To prevent reflected energy, due to mismatches in the output branches of the fan-out, from reaching the input branch of a power-tempered fan-out, two conjugate fan-outs are connected in parallel by means of a 180 degree hybrid junction. The transmitted signal is recombined by means of a pair of conjugate fan-in networks connected together at their output ends by means of a second 180 degree hybrid junction.

This invention relates to hybrid-coupled fan-out circuits employing power-tempering techniques to minimize the frequency sensitivity of the couplers.

BACKGROUND OF THE INVENTION

In my copending applications Ser. No. 507,011, filed Nov. 9, 1965, now U.S. Patent 3,423,688 and Ser. No. 632,058, filed Apr. 19, 1967, a variety of hybrid fan-out circuits are disclosed. Circuits of this type have been constructed and have been demonstrated to operate in the manner described. It has been found, however, that as the fan-out grows, i.e., the number of output branches are increased from tens of branches to thousands of branches, the frequency sensitivities of the quadrature couplers cause large imbalances in the resulting power division among the output branches. Where a fan-out is used to couple signals to a plurality of identical power amplifiers, this unequal power division results in an inefficient utilization of the power amplifiers since most of the amplifiers will be operating below their maximum power handling capability so as not to damage those few operating with relatively excess power.

It is, accordingly, the broad object of the present invention to equalize the power distribution in the branches of a quadrature hybrid-coupled fan-out circuit.

SUMMARY OF THE INVENTION

In accordance with the present invention, power equalization among the branches of a quadrature hybrid fan-out circuit is achieved by a "power-tempering" arrangement, where the term "power-tempering" connotes the admixturing of relatively high and low power feeds to produce an averaged power output. This function resembles that of a tempering valve which admixes hot and cold water to produce water at some median temperature.

In a fan-out circuit the number of branches proliferate as $2^n$, where $n$ is the number of binary levels, or the number of division. Each hybrid, at each level of division, divides the signal applied thereto into two components proportional to $\tilde{t}$ and $\tilde{k}$, where $|t|^2+|k|^2=1$. In addition, $|t|=|k|$ at least one frequency. The present invention is based upon the recognition that because of these properties of a quadrature hybrid, the unequal signals produced in pairs of symmetric branches of the fan-out at any even level of division can be combined by means of other quadrature hybrid couplers to produce pairs of tempered signals whose power contents are equal at least one frequency, and whose power-vs.-frequency characteristics are essentially flat over an extended frequency range about said frequency.

Having produced a power-tempered fan-out, in which the power distribution among the branches is essentially constant over an extended frequency range, power amplification can now be realized by means of identical amplifiers, all of which can now be operated close to or at their maximum power handling ability.

Recombination of a power-tempered signal is accomplished by making use of a simple time reversal picture. While the phase distribution of a tempered power system is relatively complex, ideally a fan-out has perfectly reactive properties. Thus, whatever the phase distribution emanating from the power-tempered fan-out may be, because of this time reversibility, a time reversed picture would show all out-going signals to be reversed, all phasors to be transformed to their complex conjugates, and all flow paths recombining perfectly in what had been the forward time input port.

To form the conjugate of a fan-out circuit, the fan-out circuit is modified by the addition of 180 degree relative phase shifters at selected locations in the circuit, since conjugacy, in a quadrature hybrid fan-out, involves shifting relative phases between 90 degrees and 270 degrees and vice versa. When used as a signal divider the signals produced by the modified circuit are conjugate to the signals produced by the unmodified fan-out. Where employed together, in a complete power division and recombination network, either network can be used to divide the input signal (fan-out) and the other network used to recombine the divided signals (fan-in).

To prevent reflected energy, due to mismatches in the output branches of the fan-out, from reaching the input branch of a power-tempered fan-out, two conjugate fan-outs are connected in parallel by means of a 180 degree hybrid junction. The transmitted signal is recombined by means of a pair of conjugate fan-in networks connected together at their output ends by means of a second 180 degree hybrid junction.

These and other objects and advantages, the nature of the present invention, and its various features will appear more fully upon consideration of the various illustrative embodiments now to be described in detail in connection with the accompanying drawings.

DETAILED DESCRIPTION

Figure 1:
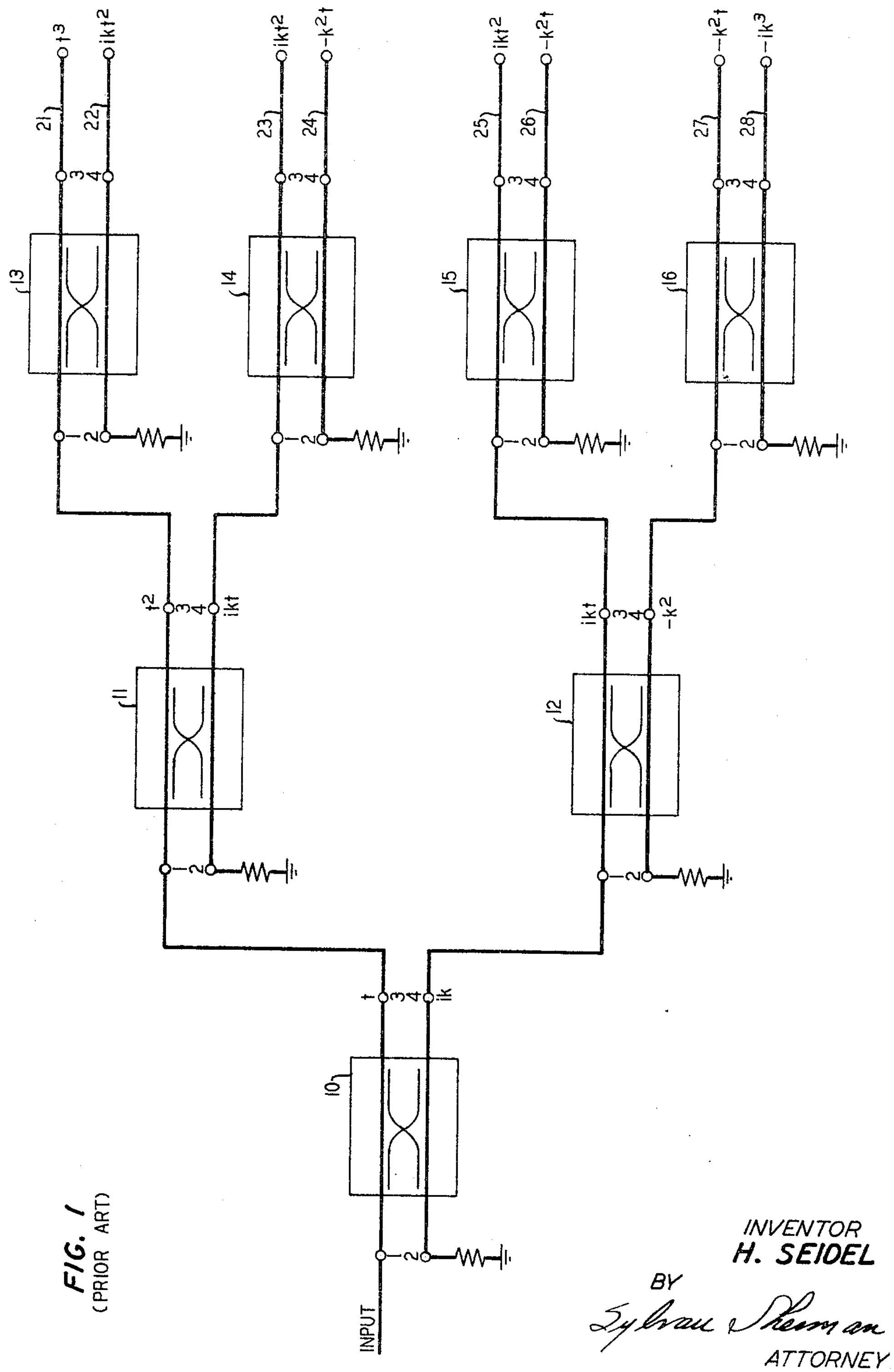
FIG. 1 shows a three-level fan-out network in accordance with the prior art.

Referring to the drawings, FIG. 1 shows a three level, eight branch hybrid-coupled fan-out (of the type described in my above-identified application Ser. No. 507,-011) comprising seven 3 db quadrature hybrid couplers 10, 11, 12, 13, 14, 15 and 16 arranged to divide an input signal, incident at branch 1 of hybrid 10, among eight output branches 21 through 28.

The terms "hybrid" and "hybrid coupler" are used herein in their accepted sense to describe a power dividing network having four branches in which the branches are arranged in pairs with the branches comprising each pair being conjugate to each other and in coupling relationship with the branches of the other of said pairs. In addition, in the so-called "quadrature" hybrid coupler the divided signal components are 90 degrees out of time phase. Examples of such hybrids are the Riblet coupler (H. J. Riblet "The Short-Slot Hybrid Junction," Proceedings of the Institute of Radio Engineers, February 1952, pages 180–184), the multihole directional coupler (S. E. Miller, "Coupled Wave Theory and Waveguide Applications," Bell System Technical Journal, May 1954, pages 661–719), the semi-optical directional coupler (E. A. J. Marcatili, "A Circular Electric Hybrid Junction and Some Channel-Dropping Filters," Bell System Technical Journal, January 1961, pages 185–196), the strip transmission line directional coupler (T. K. Shimizu "Strip-Line 3 db Directional Coupler," 1957 Institute of Radio Engineers, Wescon Convention Record, vol. 1 part 1, pages 4–15), and the lumped-element quadrature hybrids described in the copending application by H. R. Beurrier, Ser. No. 709,091, filed Feb. 28, 1968, and assigned to applicant's assignee.

In the fan-out circuit of FIG. 1, the four branches of each of the hybrids are designated 1, 2, 3 and 4, of which branches 1 and 2 constitute one pair of conjugate branches and branches 3 and 4 the other pair. More particularly, branch 1 of each coupler is the input branch, and branches 3 and 4 the output branches. Branch 2 of each coupler is match-terminated.

Figure 2:
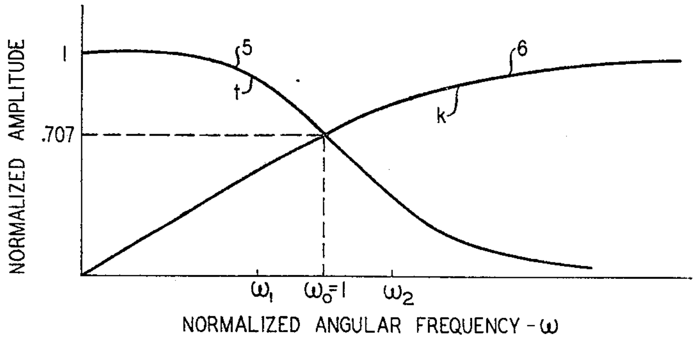
FIG. 2, included for purposes of explanation, shows the variation, as a function of frequency, of the coefficient of transmission $\tilde{t}$ and the coefficient of coupling $\tilde{k}$ of a lumped-impedance quadrature hybrid coupler.

In operation, an input signal, coupled to branch 1 of any of the hybrids, is divided into two quadrature signal components in branches 3 and 4, whose amplitudes are proportional to $\tilde{t}$ and $\tilde{k}$, respectively. For a lumped-impedance type of hybrid, such as is described in the above-identified copending application by Beurrier, the variations in amplitude of the coefficient of transmission $t$ and the coefficient of coupling $k$, as a function of frequency, are represented in FIG. 2 by curves 5 and 6. Basically, the transmission coefficient $t$ is a maximum at zero frequency and decreases as the frequency increases. The coupling coefficient $k$, on the other hand, is zero at zero frequency, and increases as the frequency increases. The two coefficients are equal in amplitude at the crossover frequency $\omega_0$. Mathematically, $\tilde{t}$ and $\tilde{k}$ can be expressed by $$\tilde{t}=\frac{1}{1+i\left(\frac{\omega}{\omega_0}\right)}=\frac{1}{1+ix} \quad (1)$$

and $$\tilde{k}=\frac{\frac{\omega}{\omega_0}}{1+i\left(\frac{\omega}{\omega_0}\right)}=\frac{x}{1+ix} \quad (2)$$

where $\omega$ is the operating angular frequency, and $$x=\frac{\omega}{\omega_0}$$

From (1) and (2) it is seen that $$|t|^2+|k|^2=1 \quad (3)$$

and $$|t(\omega)|=\left|k\left(\frac{1}{\omega}\right)\right| \quad (4)$$

As can be seen from FIG. 2, the $t$ and $k$ coefficients are equal at a frequency $\omega=\omega_0$. This is the unity power division ratio frequency since, at this frequency, the incident power is divided equally between the two output branches. However, as can also be seen, it is only at this particular frequency that this occurs. Thus, if the input signal is a broadband signal extending between frequencies $\omega_1$ and $\omega_2$, there is a significant variation in the power division ratio over the band of interest. This variation becomes more pronounced as the fan-out grows during successive levels of division. For example, a ratio of $t/k$ of 1.13 per coupler, corresponding to a 1 db difference, will, after $n$ levels of division, equal $(1.13)^n$ or $n$ db. Since fan-outs of the order of $n=13$ are contemplated, the result of such frequency selectivity is to create a tremendous variation in the signal distribution among the branches of the fan-out. The nature of this distribution, and how it can be modified, is now to be considered.

Referring again to FIG. 1, the signal distribution at various stages of a three-level fan-out are ascertained by applying a unity amplitude signal to input branch 1 of hybrid 10. The transmitted component $t$ appears at branch 3. The coupled component $k$ appears at branch 4. The symbol $i=\sqrt{-1}$ is included to designate the quadrature phase relationship between the two signal components $t$ and $k$.

The $t$ component, coupled to branch 1 of hybrid 11 in the second level of division is, in turn, divided in the same proportion to produce components $t^2$ and $ikt$. Similarly, the $ik$ component derived from hybrid 10 is coupled to branch 1 of hybrid 12 to produce components $ikt$ and $-k^2$. Carrying this process through the third level of division produces the indicated signal distribution in branches 21 through 28.

An examination of the various terms that appear, and the number of times they appear, produces the following tabulation:

TABLE I

| Term | Number of Occurrences |
|---|---|
| $t^3$ | 1 |
| $ikt^2$ | 3 |
| $-k^2t$ | 3 |
| $-k^3$ | 1 |

It will be noted that the tabulated number of occurrences for the several terms are equal to the coefficients of the binomial expansion $(t+ik)^3$. More generally, it can readily be shown that in an $n$ level system, the signal distribution in the $2^n$ branches of the fan-out are given by the binomial expansion $(t+ik)^n$. Thus, for example, in a four level system, the signal distribution is given by $$(t+ik)^4=t^4+4ikt^3-6k^2t^2-4ik^3t+k^4$$

Figure 3:
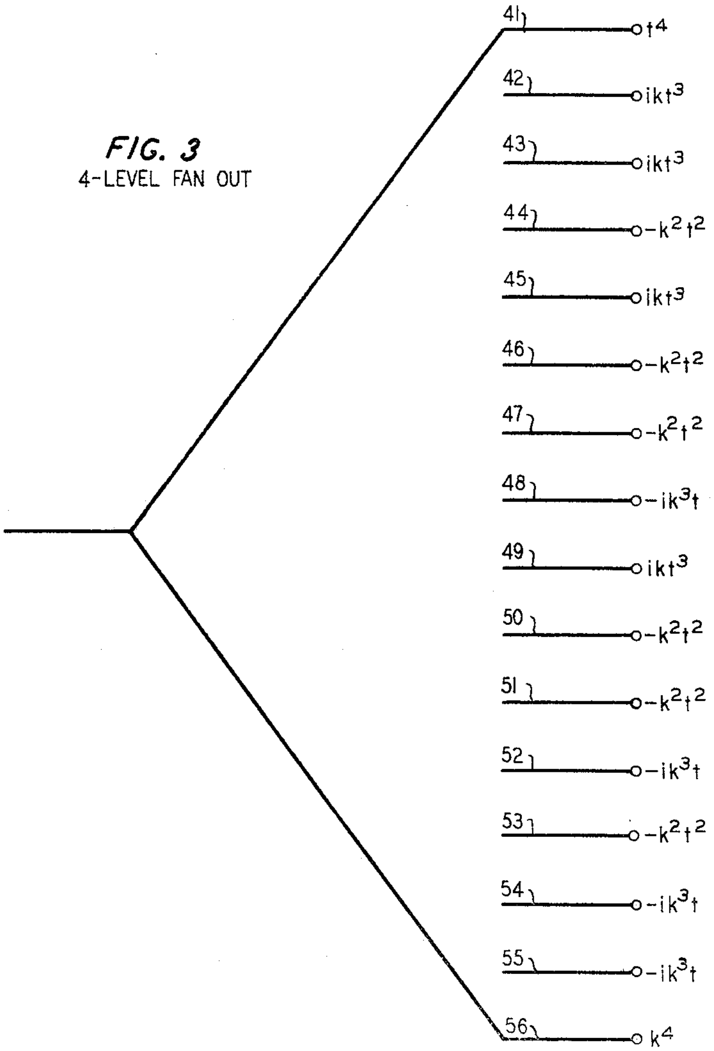
FIG. 3 shows the signal distribution among the sixteen branches of a four-level fan-out.

FIG. 3 shows the actual signal distribution in the sixteen branches 41 to 56 of a four-level fan-out in which the hybrids are ordered with respect to each other as they are in FIG. 1. That is, all the hybrids are oriented so that the input branch and the $t$-coupled branches are the upper branches, while the $k$-coupled branches are the lower output branches. In addition, there are no cross-overs.

It is apparent that as the fan-out continues to grow the signal distribution becomes more and more unbalanced, depending upon the ratio of $t$ to $k$. If the signals are ultimately to be amplified, it would be necessary either to provide amplifiers of significantly different power handling capabilities in order to handle the different power levels in each of the branches, or to provide identical amplifiers having the power handling capability required by the branch with the largest signal Obviously, this latter arrangement would be most uneconomical since only one amplifier would be operating at its rated maximum capacity while all the other amplifiers would be operating well below their rated capacity. The present invention avoids both of these limitations, inherent in prior art fan-out circuits, by means of a power-tempering arrangement in which a signal in a relatively high level signal branch and a signal in a relatively lower level signal branch are mixed in a power-tempering quadrature hybrid coupler to produce two intermediate level signals. This is done by coupling symmetric branches to one pair of conjugate branches of the tempering quadrature hybrid and extracting the two tempered signals from the other pair of conjugate branches, where the term "symmetric" branches refers to those pairs of branches carrying signals of the type $t^pk^{n-p}$ and $t^{n-p}k^p$, where $n$ is an even integer corresponding to the binary level of the fan-out, and $p$ assumes all integral values between zero and $n$, inclusive.

Table II below is a tabulation of one of a number of possible sets of pairs of symmetrical branches, and the signals therein.

TABLE II

| Pairs of Symmetrical Branches | Signal Amplitudes | $n=4$<br>$p$ |
|---|---|---|
| 41<br>56 | $t^4$<br>$k^4$ | 4 |
| 42<br>55 | $kt^3$<br>$k^3t$ | 3 |
| 43<br>54 | $kt^3$<br>$k^3t$ | 3 |
| 44<br>53 | $k^2t^2$<br>$t^2k^3$ | 2 |
| 45<br>52 | $kt^3$<br>$k^3t$ | 3 |
| 46<br>51 | $k^2t^2$<br>$k^2t^2$ | 2 |
| 47<br>50 | $k^2t^2$<br>$k^2t^2$ | 2 |
| 48<br>49 | $k^3t$<br>$kt^3$ | 1 |

This tabulation is based upon the recognition that for an ordered arrangement of hybrids, pairs of symmetrical branches are symmetrically disposed about the center of the fan-out. Thus, the first and the last branch, the second and the next to the last branch, et cetera, are symmetrical branches. However, other combinations are equally valid. Thus, for example, branch 42 could just as readily be mixed with branch 52, and branch 46 with branch 47. The physically symmetric arrangement, however, has certain structural advantages and, hence, may be preferred.

Figure 4:
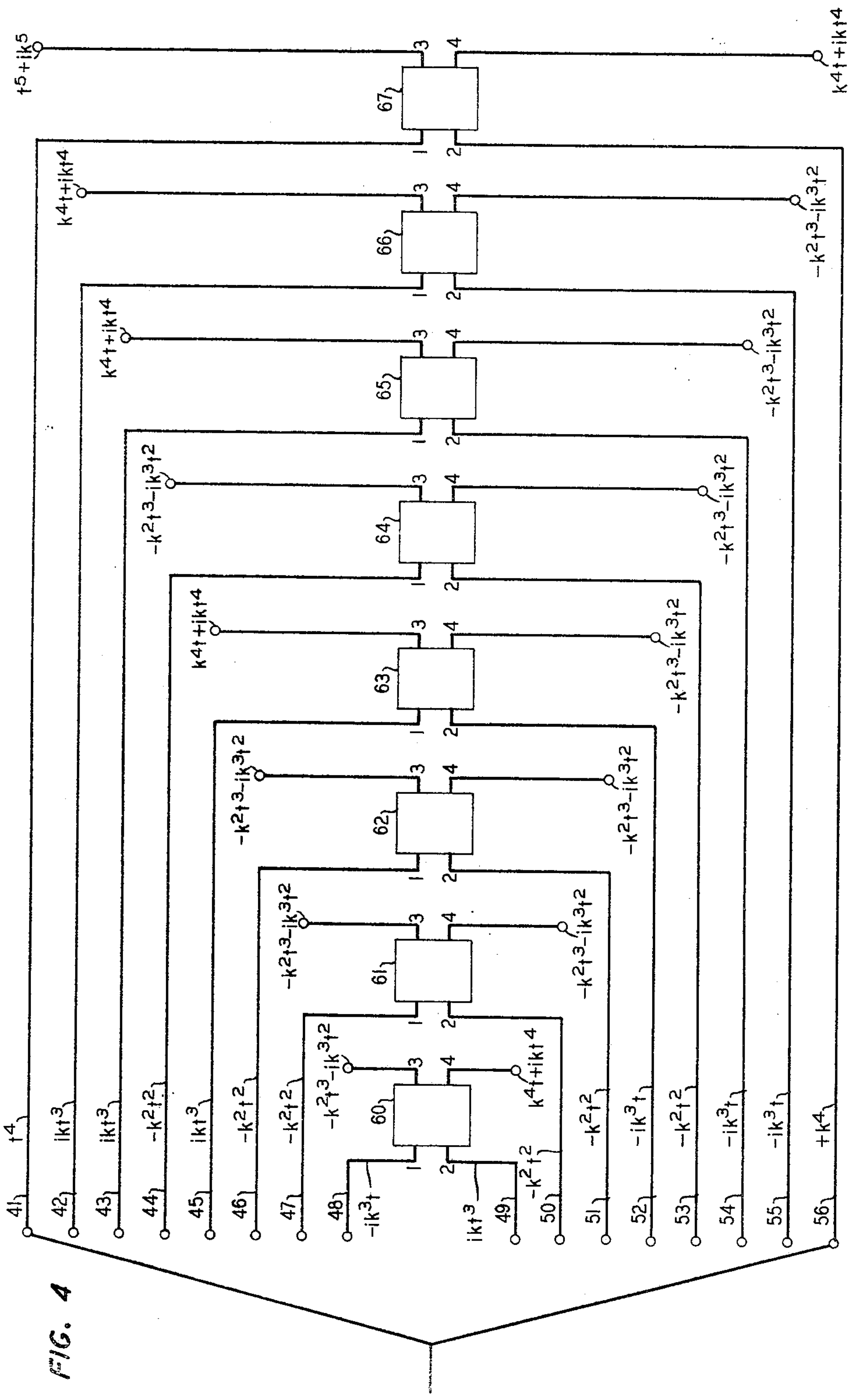
FIG. 4 shows symmetrical branches of the four-level fan-out of FIG. 3 connected to power-tampering couplers.

FIG. 4 shows the four-level fan-out of FIG. 3 including eight power-tempering quadrature couplers 60 through 67 connected in accordance with the tabulation of Table II to produce sixteen tempered output signals whose amplitude $a+ib$ are given in Table III. Also given in Table III is the tempered power $|a|^2+|b|^2$ in each of the output branches of couplers 60 through 67.

TABLE III

| Tempering Coupler | Branch | Tempered Branch Signal S8 | Power $|a_i|^2+|b_i|^2$ |
|---|---|---|---|
| 60 | 3<br>4 | $-(k^2t^3+ik^3t^2)$<br>$k^4t+ikt^4$ | $k^4t^6+k^6t^4$<br>$k^8t^2+k^2t^8$ |
| 61 | 3<br>4 | $-(k^2t^3+ik^3t^2)$<br>$-(k^2t^3+k^3t^2)$ | $k^4t^6+k^6t^4$<br>$k^4t^6+k^6t^4$ |
| 62 | 3<br>4 | $-(k^2t^3+ik^3t^2)$<br>$-(k^2t^3+ik^3t^2)$ | $k^4t^6+k^6t^4$<br>$k^4t^6+k^6t^4$ |
| 63 | 3<br>4 | $k^4t+ikt^4$<br>$-(k^2t^3+ik^3t^2)$ | $k^8t^2+k^2t^8$<br>$k^4t^6+k^6t^4$ |
| 64 | 3<br>4 | $-(k^2t^3+ik^3t^2)$<br>$-(k^2t^3+ik^3t^2)$ | $k^4t^6+k^6t^4$<br>$k^4t^6+k^6t^4$ |
| 65 | 3<br>4 | $(k^4t+ikt^4)$<br>$-(k^2t^3+ik^3t^2)$ | $k^8t^2+k^2t^8$<br>$k^4t^6+k^6t^4$ |
| 66 | 3<br>4 | $k^4t+ikt^4$<br>$-(k^2t^3+ik^3t^2)$ | $k^8t^2+k^2t^8$<br>$k^4t^6+k^6t^4$ |
| 67 | 3<br>4 | $t^5+ik^5$<br>$k^4t+ikt^4$ | $t^{10}+k^{10}$<br>$k^8t^2+k^2t^8$ |

It can be shown that; (a) the power in all the branches is the same at the crossover frequency, i.e., at $$x=\frac{\omega}{\omega_0}=1$$

and (b) that the slope of the power-vs.-frequency curve for all sixteen branches is zero at the crossover frequency. A quantitative measure of the improvement in the power distribution produced by tempering will also be given.

It will be noted that the power in any of the branches can be written as $$P=k^{2m}t^{10-2m}+t^{2m}k^{10-2m} \qquad (5)$$

where $m$ is any integer between 1 and $(n+1)$, inclusive. At the crossover frequency $$k=t=\frac{1}{\sqrt{2}}$$

and, from Equation 5, $$P=2\left[\frac{1}{\sqrt{2}}\right]^{10}=\frac{1}{16} \qquad (6)$$

That is, at midband the power is equally divided among the sixteen branches. The rate at which the power curve is changing as a function of frequency in the vicinity of the crossover frequency is obtained by differentiating Equation 5 is a function of $x$, where $x=\omega/\omega_0$. This yields $$\frac{dP}{dx}=2mk^{2m-1}\frac{dk}{dx}t^{10-2m}+(10-2m)t^{10-2m-1}\frac{dt}{dx}k^{2m}+ 2mt^{2m-1}\frac{dt}{dx}k^{10-2m}+(10-2m)k^{10-2m-1}\frac{dk}{dx}t^{2m}$$

Evaluated at $x=1$, for which $k=t$, gives $$\frac{dP}{dx}=[2m(2k^{2m-1}k^{10-2m})+(10-2m)(2k^{10-2m-1}k^{2m})]\cdot\left[\frac{dt}{dx}+\frac{dk}{dx}\right] \qquad (7)$$

From Equation 3 we have, in addition, that $$(t)^2+(k)^2=1$$

which, when differentiated with respect to $x$, gives $$2t\frac{dt}{dx}+2k\frac{dk}{dx}=0$$

*At* $t=k$, $$\frac{dt}{dx}+\frac{dk}{dx}=0 \qquad (8)$$

Substituting (8) and (7) gives $$dp/dx=0 \qquad (9)$$

Thus, each of the power expressions of Table III has the same amplitude at the crossover frequency, and zero slope at the crossover frequency. A measure of the flatness of the power-vs.-frequency response can be obtained by considering the worst case, given by the power in branch 3 of hybrid 67, and evaluating the change in power over a prescribed bandwidth. For purposes of illustration, a 20 percent bandwidth is assumed, for which $x=1.1$.

Using Equations 1 and 2, the power in branch 3 of hybrid 67, ${}_3P_{67}$, can be expressed as $${}_3P_{67}=t^{10}+k^{10}=\frac{x^{10}+1}{(x^2+1)^5} \qquad (10)$$

Equation 10 also illustrates the geometric symmetry of the power characteristic about the crossover frequency. Substituting for $x$ in Equation 10 gives $${}_3P_{67}=1/14.8$$

Compared with the power ${}_3P_{67}=1/16$ at $x=1$, the power at $x=1\pm10\%$ is off by approximately 0.34 db. This compares favorably with an increase in power of approximately 1.7 db that would be obtained without tempering.

It will be noted that in describing the signals $t^pk^{n-p}$ and $t^{n-p}k^k$ coupled into the tempering coupler, it was stated that $n$ was an even integer corresponding to the binary level of the fan-out. This was intended to emphasize that tempering is advantageously done at even binary levels of a fan-out rather than at odd levels. This is so since at odd levels, the two signal components produced in each of the branches by the tempering process are either in phase or 180 degrees out of phase. This results in strong interference effects which may quadruple the power content in one branch while reducing to zero the power content of other branches. At even levels of the fan-out, on the other hand, the two signal components produced by tempering are in time quadrature and the powers are always additive. Hence, as shown above, the power is uniformly distributed among the branches at the crossover frequency.

Having divided the signal power into $2^n$ parts and having equalized the power distribution over an extended bandwidth, the problem of recombining the $2^n$ signal components into a single signal is now considered. However, rather than attempting to trace all the signal components through a recombining or fan-in network to determine what conditions must be established in order to insure that they combine in phase at the output, let us rather view the passage of the incident signal through the power-dividing fan-out as a sequence of events such as, for example, a sequence of events as they unfold in a motion picture. It is clear that as a motion picture evolves, no matter how complex the story nor how disruptive the events depicted, when the film is run backwards, all that has transpired will be unraveled, and the initial conditions restored when the film returns to the initial frame. The only difference to be noted between running the film forward and running the film backwards is that the sequence of events depicted is reversed. That is, there is a phase reversal in that what leads in the forward running, lags in the reverse running.

Referring to Table III, it is noted that each of the branch signals is a complex number. Thus, the transmission coefficient between the input to the fan-out and any branch is given as $$S_j=a_j\pm ib_j \qquad (11)$$

where $j$ is the branch designation and includes all integers between one and $2^n$. It is also known that the sum of the powers in all $2^n$ branches is equal to the input power, or $$\sum_{j=1}^{2^n}|S_j|^2=\sum_{j=1}^{2^n}|a_j|^2+|b_j|^2=1 \qquad (12)$$

Since the recombining network must produce a phase reversal, the recombining network must be the conjugate of the dividing network Expressed mathematically, the transmission coefficient between the output of the recombining network and each of the branches is $$S_j^*=a_j\pm ib_j \qquad (13)$$

The total power transfer between the input and output branches is then given as $$\sum_{j=1}^{2^n}S_jS_j^* \qquad (14)$$

However, since $S_jS_j^*$ is equal to $|a_j|^2+|b_j|^2$, from Equation 12 we see that the power transfer, given by Equation 14 is also equal to unity, and all the input power is delivered to the output branch of the recombination fan-out.

Figure 5:
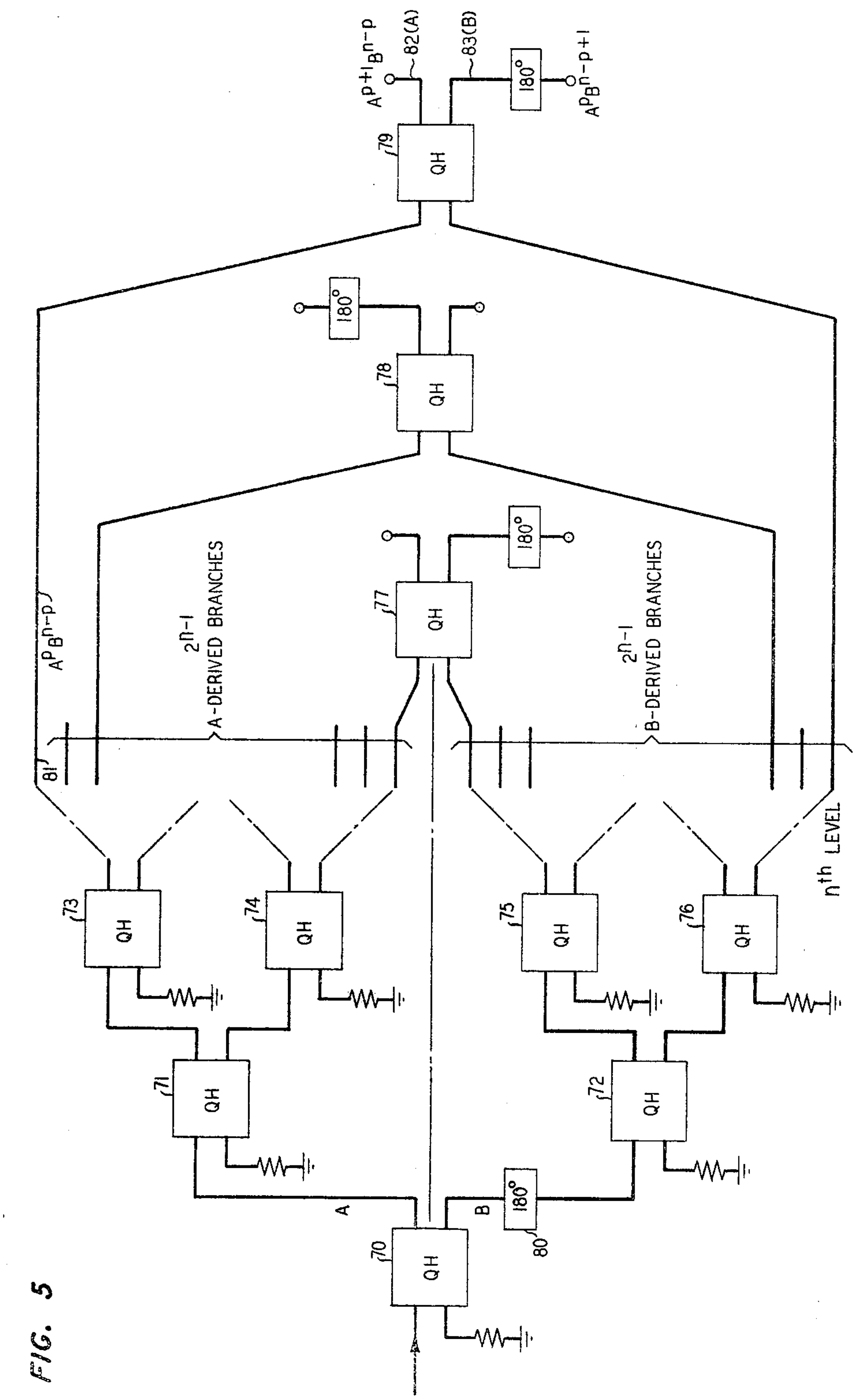
FIG. 5 shows a conjugate power-tempered fan-out.

FIG. 5 shows an $n$-level, power-tempered fan-out circuit which has been modified, in a manner to be described, to produce output signals which are conjugates of the signals produced in the unmodified fan-out circuits that have been considered thereinabove. In the interest of generality, the coupling coefficients for each of the couplers 70–79 (and those not shown but indicated by the dashed lines) are designated as A and B, where A can be either $\tilde{t}$ or $\tilde{k}$ and vice versa for B.

The modification necessary to form a conjudgate fan-out network involves the insertion of 180 degrees relative phase shifters in selected branches of the fan-out. The first of these phase shifters is inserted in one of the output branches of the first hybrid 70. In the illustrative embodiment of FIG. 5, a phase shifter 80 is shown placed in the B branch.

The remaining phase shifters are inserted in selected output branches of the power-tempering couplers. As is evident from an examination of FIG. 1, half or, more generally, $2^{n-1}$ branches of any untempered fan-out are derived from the A branch of the input hybrid 70. These are designated in FIG. 5 as the $2^{n-1}$ A-derived branches. Similarly, there will be an equal number of branches which derive from the B branch of hybrid 70. These are identified as the $2^{n-1}$ B-derived branches.

Having placed the first phase shifter in the B branch of hybrid 70, we now confine our attention to the A-derived output branches. In particular, we examine the exponent of the signals coupled from each of the A-derived branches to the output branches of each of the $2^{n-1}$ power-tempering hybrids. If this exponent is even, a 180 degree relative phase shifter is placed in that output branch. If the exponent is odd, nothing is added. For example, A-derived branch 81 is coupled to tempering hybrid 79. Designating the signal in branch 81 as $A^pB^{n-p}$, the signal component coupled to the A branch 82 of hybrid 79 is given as $A^{p+1}B^{n-p}$, while the signal component coupled to the B branch 83 is given as $A^pB^{n-p+1}$. If $p$ is even, the exponent of A in branch 82, being $p+1$, is odd, and nothing is added to this output branch. The exponent of A in branch 83, however, is even and an additional 180 degree phase shifter 84 is added.

This is done for each of the power-tempering hybrids. For an $n$-level system there will be $2^n$ branches, of which half, or $2^{n-1}$ branches will include 180 degree phase shifters. Including the one added to the input hybrid, a conjugate network will include a total of $(2^{n-1}+1)$ relative phase shifts.

Figure 6:
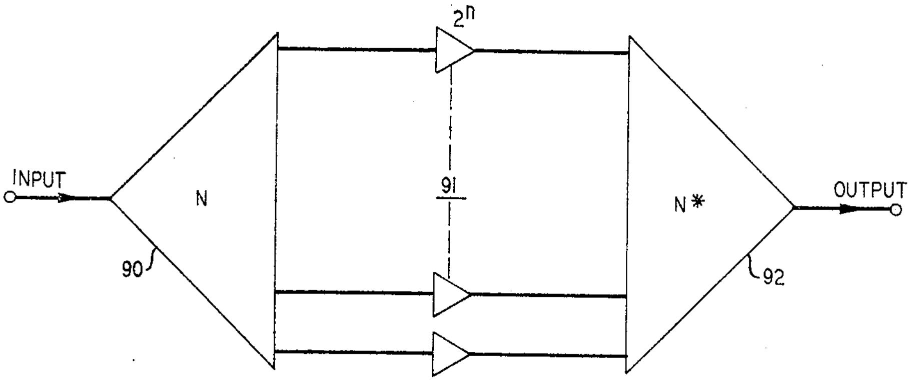
FIG. 6 shows, diagrammatically, a fan-out network coupled to a conjugate fan-in network.

Having formed the conjudgate network, a complete power-tempered network would include, as shown in FIG. 6, a divider fan-out network 90; a plurality 91 of $2^n$ branch circuits, including amplifiers, where each branch of the fan-out is connected to a conjudgate branch of the fan-in circuit; and a conjudgate fan-in recombination network 92.

Figure 7:
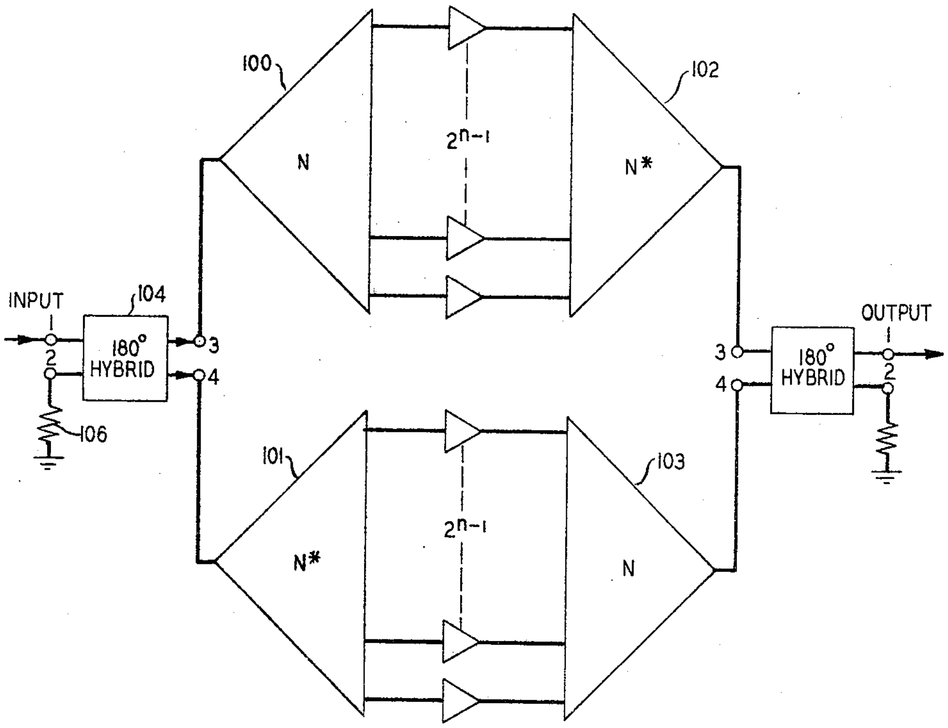
FIG. 7 shows a parallel-conjugate arrangement of fan-out and fan-in networks to minimize reflections in the input and output circuits.

One of the advantages of a quadrature hybrid-coupled fan-out resides in the fact that reflections due, for example, to discontinuities at the amplifiers in the fan-out branches, are coupled to the match-terminated branches of the hybrids, with none of the reflected energy reaching the input branch of the network. In a tempered fan-out, however, the signal phases are such that this advantageous situation no longer pertains, and some of the reflected energy reaches the input circuit. Where the amplitude of the reflected energy is such that this would present a serious problem, a parallel-conjugate fan-out arrangement, as illustrated in FIG. 7, can be employed. In this arrangement, two, parallel-connected fan-outs 100 and 101, of $2^{n-1}$ branches each, are used instead of a single fan-out having $2^n$ branches. In addition, the fan-out networks are conjugates of each other, hence the N designation for fan-out 100 and the N* designation for fan-out 101. Recombination, as in FIG. 6, is by means of conjudgate fan-in networks 102 and 103, where network 102 is the conjugate of network 100 and network 103 is the conjugate of network 101.

The input signal is divided into two equal components and each one of the two components is coupled to one of the two fan-out networks by means of a 180 degree hybrid junction 104. A second 180 degree hybrid 105 is used to recombine the two amplified signals derived from fan-in networks 102 and 103.

Because of the conjugate nature of the fan-out networks 100 and 101, reflected energy arrives at branches 3 and 4 of the input hybrid 104 either in phase or 180 degrees out of phase, depending upon the manner in which coupler 104 is connected. In either case, the reflected energy adds together in branch 2 of coupler 104 wherein it is dissipated in a terminating resistor 106.

In the discussion hereinabove, the transmission and coupling coefficients of the hybrid couplers were characterized by the curves of FIG. 2. This, however, was merely for purposes of illustration since the variations of these parameters can be conveniently and simply expressed mathematically by Equations 1 and 2. More generally, however, the invention is equally applicable to other types of quadrature hybrid couplers and combinations thereof. For example, there is an advantage in using higher quality (broader bandwidth) couplers at the lower levels of division as a means of producing a fan-out having a broader overall bandwidth. While such couplers would typically be more expensive, they would be used in relatively small numbers and, hence, would not represent a significant increase in the total cost of the fan-out. For example, let us assume the need for a basic $n$-level binary fan-out in which the first $q$-levels are formed of higher quality couplers, and the remaining $(n-q)$-levels are formed of less expensive couplers. If $n=12$ and $q=6$, the fan-out will include 252 higher cost couplers and 24,320 less expensive couplers. Since the higher cost couplers represent only about one percent of the total number of couplers, they could be designed to be essentially flat over the band of interest, thus effectively making the power distribution in the $2^n$ branches of a twelve-level the equivalent of that of a six-level fan-out for very little extra cost.

Figure 8:
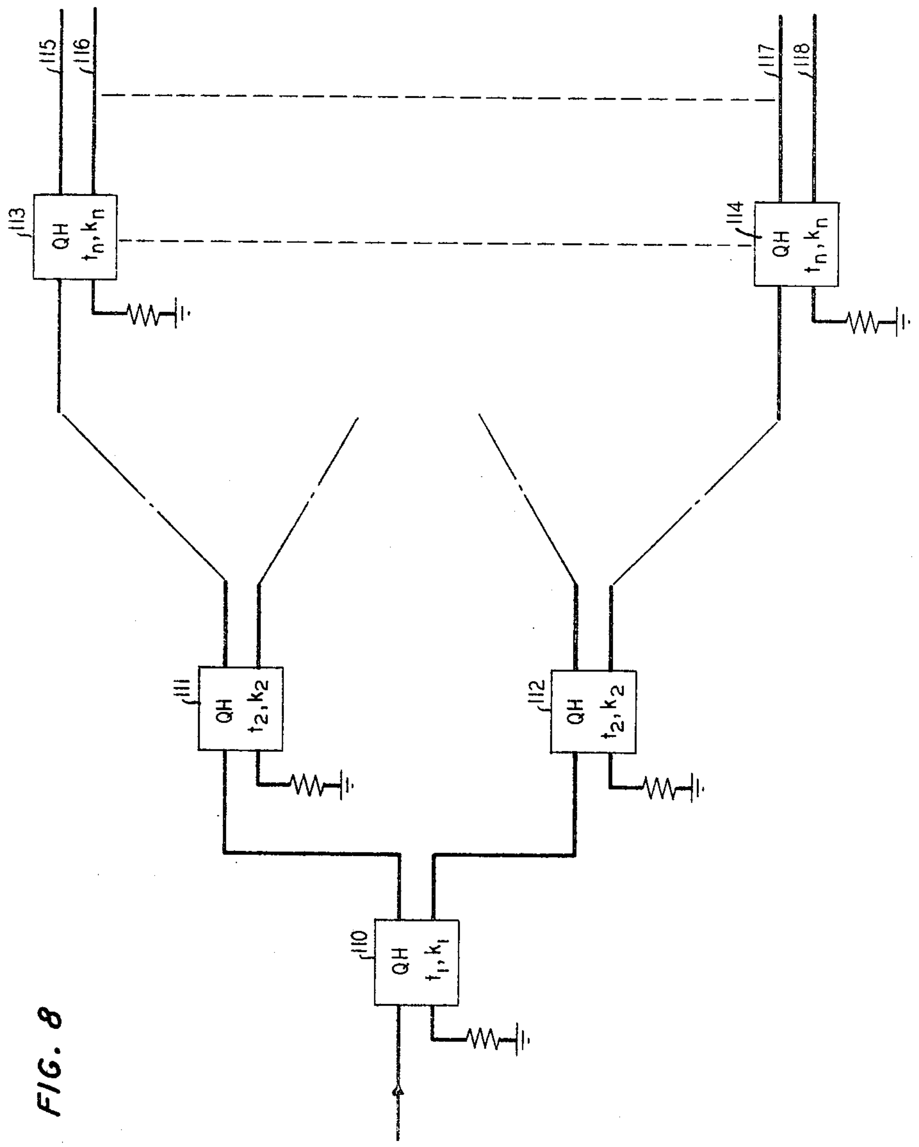
FIG. 8 shows, more generally, a fan-out network using different quadrature couplers at each level of division.

The most general fan-out circuit is shown in FIG. 8, wherein different couplers are used at each binary level. Thus, the input coupler 110 is characterized by a coefficient of transmission $t_1$ and a coefficient of coupling $k_1$. Couplers 111 and 112 have coefficients $t_2$ and $k_2$, while the last group of couplers 113 . . . 114 have coefficients $t_n$ and $k_n$. The signals in the output branches 115 . . . 118 are then of the form $$t_1 t_b \ldots t_c \cdot k_j k_l \ldots k_m$$

where the subscripts are all different integers between two and $n$. It will be noted that there are $p$ number of $t$ factors, and $(n-p)$ number of $k$ factors, where $p$ assumes all integral values between zero and $n$.

A symmetrical branch will have a signal proportional to $k_1 k_b \ldots k_c \cdot t_j t_l \ldots t_m$, where there are $p$ number of $k$ factors, and $(n-p)$ number of $t$ factors. Power-tempering, as above, consists in admixing signals in symmetrical branches.

If the power distribution in the branches of a fan-out is plotted as a function of the branch number, it is found to be essentially constant for the overwhelming majority of branches. There is an increase in the power content in a few branches at one end of the fan-out and a decrease in the power content in a few of the branches at the other end of the fan-out and a decrease in the power content in a few of the branches at the other end of the fan-out at the extremes of the frequency range. If identical amplifiers are used in each of the branches, it is obvious that the power handling capability of the amplifiers must be such as to handle the worst case and, hence, the overwhelming majority of the amplifiers would be overdesigned, and would operate below saturation. This situation can be avoided by the insertion of an attenuator in the higher power branches so as to reduce their power content to that of the majority of branches and then design the amplifiers to operate at the lower power levels. While there is some power loss inherent in this arrangement, the total power content of a few branches of a high-level fan-out is not great and, hence, this relatively small loss is an advantageous trade off. As an example, let us consider a 12-level fan-out, and examine the power deviation at ±5% of center band. The worst branch, of form $(t^{13}+k^{13})$, has a power content that is up 19.4 percent. The next worst case is represented by 13 branches of the form $(t^{12}k \pm k^{12}t)$ which are up 13.4 percent. The third worst case includes 88 branches of the form $(t^{11}k^2 \pm k^{11}t^2)$, up 8 percent. Further reduction is unwarranted, since the next lower power term is up only 0.19 db.

Equalization of the three worst cases would represent a total loss in power of $$\frac{(1)(.194)+(13)(.134)+(88)(.08)}{4096}=2.183 \cdot 10^{-3}$$

or .0095 db. This loss is clearly negligible and, advantageously, the method of equalization is inexpensive.

Having reduced the power spread to 0.19 db, we are below any practical margins of power rating and further effort is unwarranted.

It has been demonstrated that very large fan-out arrays can be constructed with intrinsically inexpensive and small components, covering bandwidths of the order of ten percent or more. While two independent techniques of minimizing power spread in the array have been disclosed, these techniques can be used cooperatively to achieve even further benefit.

Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

I claim:

1. A power-tempered fan-out network comprising:
a first plurality of $(2^n-1)$ quadrature hybrid couplers connected in a fan-out arrangement to provide $2^n$ branches, where $n$ is an even integer, and wherein the coefficient of transmission and the coefficient of coupling for the couplers at each level of division are $t_i$ and $k_i$, respectively, $i$ being any integer between one and $n$ inclusive;
and a second plurality of $2^{n-1}$ quadrature hybrid couplers connected to admix the signals in symmetrical pairs of said branches to produce an equal number of pairs of tempered signals, where symmetrical branches are defined as any two branches wherein the signals are proportional to $t_1 t_b \ldots t_c \cdot k_j k_l \ldots k_m$ and $k_1 k_b \ldots k_c \cdot t_j t_l \ldots t_m$, and where all subscripts are different integers between two and $n$.

2. The network according to claim 1 where all said hybrids are the same and the signals in symmetrical branches are proportional to $t^p k^{n-p}$ and $k^p t^{n-p}$, where $p$ assumes all integral values between zero and $n$.

3. The network according to claim 1 wherein the hybrids in the first $q$ levels of division of said fan-out are broader band than the hybrids in the remaining $(n-q)$ levels of division of said fan-out.

4. The network according to claim 1 including a 180 degree relative phase shifter located in one of the output branches of the first hybrid in said fan-out, and including a 180 degree relative phase shifter in one of the output branches of each of said second plurality of hybrids.

5. A power division and recombination network comprising:

an $n$-level power-tempered fan-out network in accordance with claim 1;

an $n$-level power-tempered fan-in conjugate of the network of claim 1;

and means for coupling each one of the $2^n$ branches of said fan-out network to a conjugate branch of the $2^n$ branches of said fan-in network.

6. A power division and recombination network comprising:

first and second $n$-level power-tempered fan-out networks in accordance with claim 1, and first and second conjugates of said $n$-level power-tempered fan-out networks;

an input 180 degree hybrid coupler for dividing an input signal into two equal components;

means for coupling one of said components to the first of said fan-out networks;

means for coupling the other of said components to the first of said conjugate fan-out networks;

means for coupling each one of the $2^n$ branches of said first fan-out network to a conjugate branch of the $2^n$ branches of said second conjugate fan-out network;

means for coupling each one of the $2^n$ branches of said first conjugate fan-out network to a conjugate branch of the $2^n$ branches of said second fan-out network;

and means comprising a second 180 degree hybrid coupler for combining the output signals from said second fan-out network and from said second conjugate fan-out network.

7. A power-dividing network comprising:

a first plurality of $(2^n-1)$ quadrature hybrid couplers connected in a fan-out arrangement to provide $2^{n-1}$ A-derived branches and $2^{n-1}$ B-derived branches, where A and B are the coefficients of coupling between the input branch and the two output branches of the first hybrid in said fan-out, and $n$ is an even integer;

means disposed in the B-coupled branch of said first hybrid coupler for introducing a 180 degree relative phase shift between the signal in said B-coupled branch and the signal in the A-coupled branch of said first hybrid;

a second plurality of $2^{n-1}$ quadrature hybrid couplers connected to admix the signals in symmetrical pairs of said branches to produce an equal number of pairs of tempered signals, where symmetrical branches are defined as one A-derived branch wherein the signal is proportional to $A^p B^{n-p}$ and one B-derived branch wherein the signal is proportional to $B^p A^{n-p}$, and $p$ assumes all integral values between zero and $n$ inclusive;

and a 180 degree relative phase shifter disposed in the output branch of each of said second plurality of hybrids wherein the exponent of the A factor of the A-derived signal component is even.

References Cited

UNITED STATES PATENTS

| | | | |
|---|---|---|---|
| 3,030,501 | 4/1962 | Rapceano | 333—11 X |
| 3,423,688 | 1/1969 | Seidel | 333—11 X |

HERMAN KARL SAALBACH, Primary Examiner

PAUL L. GENSLER, Assistant Examiner

U.S. Cl. X.R.

333—28